US008491789B2

(12) United States Patent
Butters et al.

(10) Patent No.: US 8,491,789 B2
(45) Date of Patent: Jul. 23, 2013

(54) WATER TREATMENT PROCESS FOR THE REDUCTION OF THM AND HAA FORMATION

(76) Inventors: Brian E. Butters, London (CA); Anthony L. Powell, London (CA)

(*) Notice: Subject to any disclaimer, the term of this patent is extended or adjusted under 35 U.S.C. 154(b) by 208 days.

(21) Appl. No.: 12/848,016

(22) Filed: Jul. 30, 2010

(65) Prior Publication Data
US 2011/0024352 A1    Feb. 3, 2011

Related U.S. Application Data

(60) Provisional application No. 61/230,582, filed on Jul. 31, 2009.

(51) Int. Cl.
| | |
|---|---|
| *C02F 9/04* | (2006.01) |
| *C02F 9/14* | (2006.01) |
| *C02F 1/32* | (2006.01) |
| *C02F 3/06* | (2006.01) |
| *C02F 9/00* | (2006.01) |

(52) U.S. Cl.
CPC ... *C02F 9/00* (2013.01); *C02F 1/32* (2013.01); *C02F 3/06* (2013.01)
USPC ...... 210/617; 210/631; 210/748.14; 210/151; 210/192; 210/202

(58) Field of Classification Search
USPC .......... 210/615, 616, 617, 618, 631, 748.13, 210/748.14, 150, 151, 192, 202, 205, 259
See application file for complete search history.

(56) References Cited

U.S. PATENT DOCUMENTS

| | | | | |
|---|---|---|---|---|
| 5,620,891 | A * | 4/1997 | Drummond et al. | 210/617 |
| 6,228,266 | B1* | 5/2001 | Shim | 210/617 |
| 7,160,461 | B2* | 1/2007 | Uphoff | 210/631 |
| 7,785,469 | B2* | 8/2010 | Maclean | 210/150 |
| 2009/0032460 | A1* | 2/2009 | Yamasaki et al. | 210/151 |
| 2009/0266763 | A1* | 10/2009 | Yamasaki et al. | 210/151 |
| 2011/0089107 | A1* | 4/2011 | Marsolek et al. | 210/616 |

* cited by examiner

*Primary Examiner* — Christopher Upton
(74) *Attorney, Agent, or Firm* — Baker & McKenzie LLP

(57) ABSTRACT

Disclosed herein are systems and process integrating the chemical-free oxidation of a photocatalytic decontamination process with a biological decontamination system to eliminate the THM and HAA precursors in drinking water. In one embodiment, a system may comprise a source providing fluid media contaminated with toxic natural organic matter, and a photocatalytic decontamination subsystem configured to oxidize the toxic natural organic matter via a photocatalytic process into non-toxic natural organic matter having a molecular weight low enough for biodegrading said non-toxic matter. The system may include a biological decontamination subsystem configured to immediately receive the contaminated fluid output from the photocatalytic decontamination subsystem, and employing a biological agent to biologically degrade the low-molecular weight non-toxic natural organic matter in the contaminated fluid to a concentration sufficient to prevent the formation of trihalomethanes or haloacetic acids. Also, such a system may include a disinfectant sub-system configured to disinfect the fluid output from the biological decontamination subsystem.

14 Claims, 3 Drawing Sheets

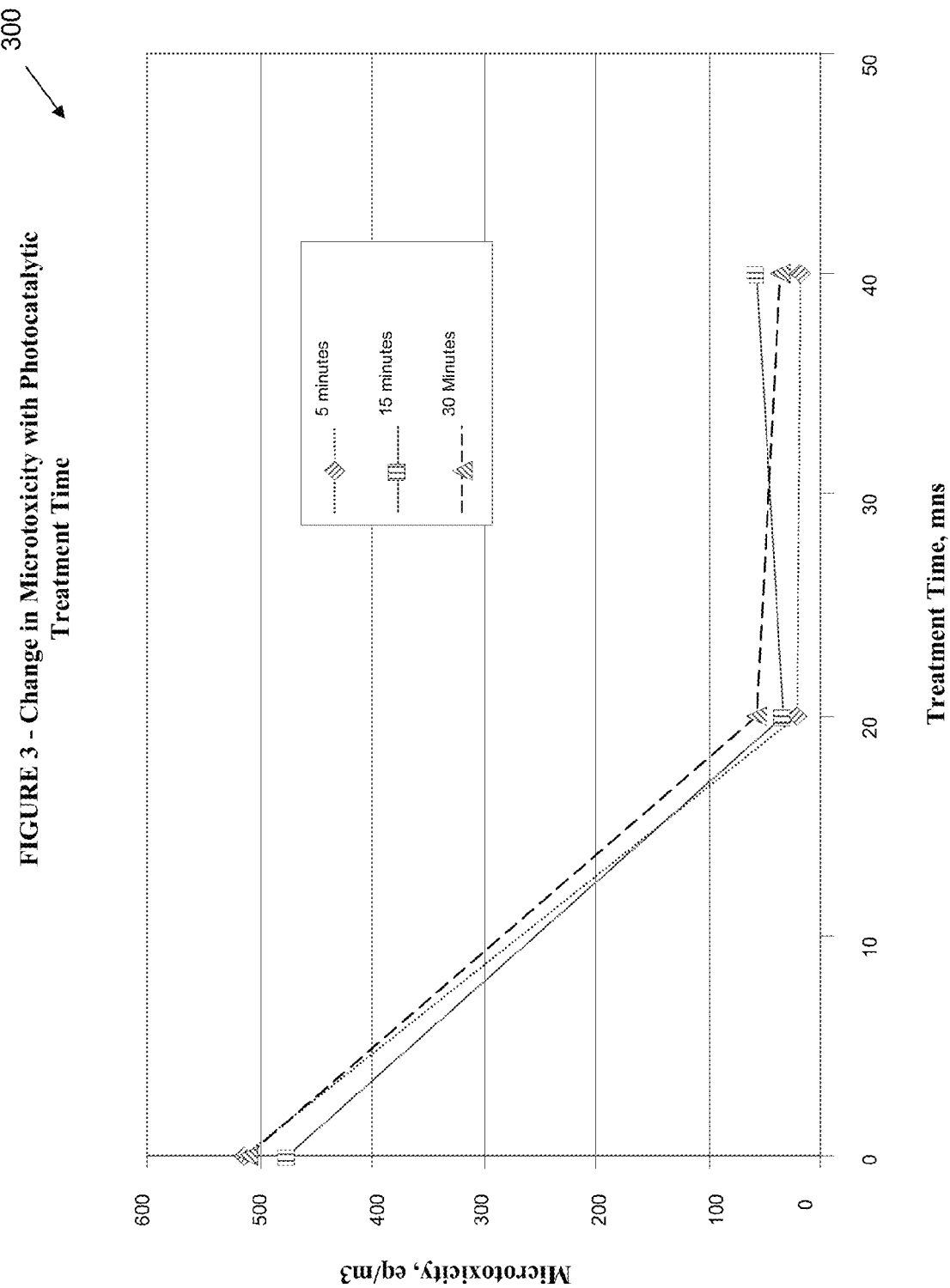

WATER TREATMENT PROCESS FOR THE REDUCTION OF THM AND HAA FORMATION

RELATED PATENT MATERIALS

The present disclosure claims priority to U.S. Provisional Patent Application No. 61/230,582, filed Jul. 31, 2009, which is incorporated herein by reference in its entirety. The present disclosure is also related to U.S. Pat. No. 5,554,300 and U.S. Pat. No. 5,462,674 pertaining to photocatalytic treatment of contaminated media, which are both incorporated herein by reference in their entirety.

BACKGROUND

In North America, drinking water is chlorinated prior to discharge to distribution for public consumption in order to prevent biological contaminants from forming in the distribution prior to consumer use/consumption. In practice, such chlorination would occur after the water has undergone any biological decontamination processes in order to prevent the formation of biological contaminants after such processing. However, typically no biological treatment processes are even used for drinking water systems, and are instead limited to use in sanitary water applications.

While successful in preventing biological contaminants from forming in the distribution, one of the major drawbacks from this chlorination practice is that the chlorine will react with naturally occurring matter (NOM) present in the water. This reaction can form toxic chemicals called trihalomethanes (THMs) and haloacetic acids (HAAs). Although such toxic chemicals are dangerous to consumers, current laws are somewhat loose in regulating the allowable concentration of THMs and HAAs in drinking water. In face of ever-increasing environmental concerns, more stringent regulations are being implemented to greatly reduce the amounts of allowable THMs and HAAs in drinking water, in some cases down to about 80 parts per billion along the entire lengths of the distribution lines.

In order to combat the formation of THMs and HAAs, some water treatment plants have included the addition of ammonia, in addition to the chlorine, to produce chloramines in the water. Chloramines are less aggressive at creating THMs and HAAs when reacting with NOM, however, they are also less aggressive at disinfection as well when compared to free chlorine.

Other common water treatment practices include coagulation, sedimentation, filtration and disinfection. In such approaches, organic matter is coagulated and allowed to settle, with the water then filtered and disinfected. Although such a coagulation-based approach is effective at removing high molecular weight organics, such as lignins and tannins, from the water, such an approach does not provide effective pretreatment to the THM and HAA precursors, as the precursors tend to be small molecular weight compounds. Still other approaches involve alternative oxidation processes (AOPs) where an oxidant, such as ozone or hydrogen peroxide or other aggressive oxidant, is added to the water. While somewhat successful in eliminating THM and HAA precursors, such AOPs require an additional step to remove the residual oxidant added to the water. Accordingly, what is needed is a system and process for eliminating the formation of THMs and HAAs in the drinking water distributed for public consumption that does not suffer from the deficiencies of the conventional approaches. This disclosure addresses the deficiencies of conventional approaches.

SUMMARY

Disclosed herein are systems and process integrating the chemical-free oxidation of a photocatalytic decontamination process with a biological decontamination system to eliminate the THM and HAA precursors in drinking water. In one embodiment of a system for decontaminating fluid media, the system may comprise a source providing fluid media contaminated with toxic natural organic matter, and a photocatalytic decontamination subsystem configured to oxidize the toxic natural organic matter via a photocatalytic process into non-toxic natural organic matter having a molecular weight low enough for biodegrading said non-toxic matter. Next such an exemplary system may include a biological decontamination subsystem configured to immediately receive the contaminated fluid output from the photocatalytic decontamination subsystem, and employing a biological agent to biologically degrade the low-molecular weight non-toxic natural organic matter in the contaminated fluid to a concentration sufficient to prevent the formation of trihalomethanes or haloacetic acids. Also, such a system may include a disinfectant sub-system configured to disinfect the fluid output from the biological decontamination subsystem, the disinfectant sufficient to remove substantially all remaining non-toxic natural organic matter and biological agent.

In other aspects, method of decontaminating fluid media are provided. In one exemplary embodiment, such a method may comprise providing a fluid media contaminated with toxic natural organic matter to a photocatalytic decontamination subsystem. Such a method may then comprise oxidizing the toxic natural organic matter via a photocatalytic process into non-toxic natural organic matter having a molecular weight low enough for biodegrading said non-toxic matter. Afterwards, such a method may comprise employing a biological process to biologically degrade the low-molecular weight non-toxic natural organic matter in the contaminated fluid to a concentration sufficient to prevent the formation of trihalomethanes or haloacetic acids. Then, such a method may also include disinfecting the fluid output from the biological decontamination subsystem sufficient to remove substantially all remaining non-toxic natural organic matter and biological agent introduced by the biological process.

In a more detailed embodiment, a method of decontaminating fluid media in accordance with the disclosed principles may comprise providing a fluid media contaminated with toxic natural organic matter to a photocatalytic decontamination subsystem, and introducing a photoreactant to the contaminated fluid media, the toxic natural organic matter adsorbing to the photoreactant. Such an exemplary method may then comprise irradiating the adsorbed photoreactant and toxic matter molecules with ultraviolet radiation to oxidize the toxic natural organic matter into non-toxic natural organic matter having a molecular weight low enough for biodegrading said non-toxic matter. Next, such a method may comprise introducing a biological agent to the contaminated fluid media immediately after the oxidizing to biologically degrade the low-molecular weight non-toxic natural organic matter to a concentration sufficient to prevent the formation of trihalomethanes or haloacetic acids. Then, such an exemplary method may comprise disinfecting to the fluid immediately after the biodegrading sufficient to remove substantially all remaining non-toxic natural organic matter and biological agent introduced by the biological process.

BRIEF DESCRIPTION OF THE DRAWINGS

Features, aspects, and embodiments of the inventions are described in conjunction with the attached drawings, in which:

FIG. 3 illustrates a graph setting forth toxicity data from a photocatalytic decontamination process test on soil washing liquid.

DETAILED DESCRIPTION

Figure 1:
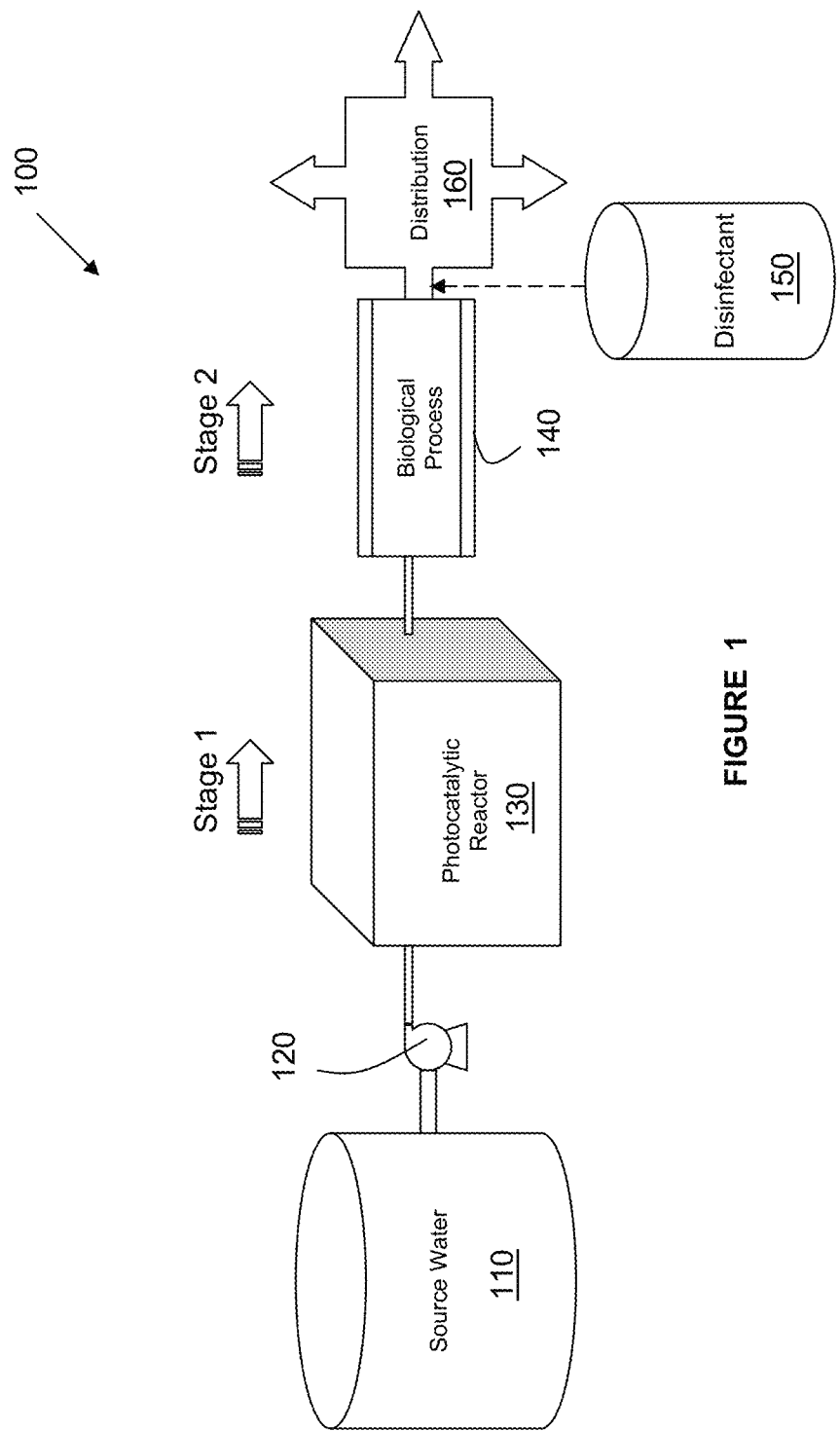
FIG. 1 illustrates a block diagram of one embodiment of a decontamination system constructed in accordance with the disclosed principles.

A system or process constructed and implemented according to the principles disclosed herein integrates the chemical-free oxidation of a photocatalytic decontamination process with a biological decontamination system to eliminate the THM and HAA precursors in drinking water. FIG. 1 illustrates a block diagram of one embodiment of a decontamination system 100 constructed in accordance with the disclosed principles.

As illustrated, the source water 110 to be decontaminated is provided into the system 100, for example, via a pump 120. The source water 110 may be groundwater or surface water, or other similar water to be decontaminated. In addition, the source water 110 may have some type of pretreatment (not illustrated) applied to it before being introduced into the present system 100. Such a pretreatment may include a coagulation/sedimentation process, such as those found in conventional approaches.

The photocatalytic decontamination process, such as the type disclosed in U.S. Pat. No. 5,554,300, is then performed using a photocatalytic reactor 230. The photocatalytic decontamination process serves to oxidize natural organic matter into low-molecular weight, biologically degradable organics. In exemplary systems, TiO2 may be employed as the photo-reactant in the photocatalytic decontamination system 130, which as discussed in the above-incorporated '300 patent, binds to organic contaminants and then those bound particles are irradiated with UV light to induce a photocatalytic reaction on the organic contaminants. Of course, other similar photo reactants may also be selected for the photocatalytic decontamination system 130.

Downstream from the photocatalytic decontamination system 130 is a biological decontamination system 140. The biological decontamination system 140 is configured to receive the output from the photocatalytic decontamination system 130. The biological decontamination system 140 will further reduce the concentration of organic compounds in the water (or similar contaminated fluid) with the ultimate result being to produce high-quality water that can be disinfected with simple chlorine (i.e., sodium hypochlorite) or similar disinfectant 150 prior to the distribution system or network 160 used to distribute the water for drinking purposes. In addition, in accordance with the disclosed principles, the water is disinfected as described above, while minimizing the concentration of THMs and HAAs in the distribution due to a marked reduction or elimination of natural organic matter in the distribution water stream provided to the distribution network 160.

The low molecular weight of the biologically degradable organics in the non-toxic water that the photocatalytic decontamination system 130 produces is ideal for feeding into any biological decontamination process 140. Exemplary biological processes 140 are readily found in the existing field. Specifically, the photocatalytic decontamination system 130 breaks down the natural organic matter in the water to a biologically degradable level that the biological process 140 can reduce or eliminate altogether. Put succinctly, the disclosed novel use of a photocatalytic decontamination system 130 prior to a biological process 140 "turns liver into candy" for the organisms present in the biological process 140. Moreover, this is done in a chemical-free manner, since the output stream from the photocatalytic decontamination system 130 does not include any residual oxidants (e.g., hydrogen peroxide), nor are any chemical additives needed in order to break down the organic matter to a biodegradable level that can be processes by the biological process 140.

Furthermore, utilizing a biological process 140 downstream of a photocatalytic decontamination system 130 significantly reduces operating cost of the photocatalytic system 130. More specifically, the energy requirements required for the photocatalytic process to mineralize all or substantially all of the natural organic matter into $CO_2$ and water is 10-100 times greater than the energy required to oxidize the natural organic matter into biologically degradable compounds.

Looking at the downstream biological system 140, there are many forms of biological processes that can be used. For example, it could consist of a simple biologically active activated carbon bed in which the carbon is allowed to 'ripen' with biological activity in the absence of a disinfectant or oxidant. This type of biological system 140 is simple, has a small footprint, and would have negligible operating costs. Of course, other biological processes for biodegrading the broken down naturally occurring organic materials present after the photocatalytic decontamination process 130 may also be employed.

Turning back to the photocatalytic decontamination process 130 employed prior to the biological decontamination process 140, the photocatalytic decontamination process 130 is an alternative treatment technology which can destroy natural organic matter such that there is insufficient organic matter to react with the chlorine. However, when the photocatalytic decontamination process 130 is employed prior to chlorination, the level of THMs (and typically HAAs) in a water supply would actually be increased without the secondary process of the biological system 140. Table 1, shown below, illustrates total THM (i.e., TTHM) data from a test performed by the present inventors on actual well water from a municipal water treatment plant in Ontario, Canada, once a photocatalytic decontamination process 130 was employed alone.

TABLE 1

| kWh/m3 | [TTHM] (ug/L) |
|---|---|
| 0 | 54.5 |
| 1 | 83.9 |
| 2 | 90.3 |
| 4 | 113 |

As provided in Table 1, the THMs formed in the water increased with increasing treatment, rather than decreased.

The reason this increase occurred is that the photocatalytic decontamination process oxidized the larger natural organic matter compounds into smaller compounds at these treatment levels. When those smaller compounds are left in the water without any additional processing, those compounds then can convert to THMs and HAAs. Since there is an increase in natural organic matter available to convert to THM, the THM count necessarily increases.

Similar research by Arizona State University (ASU) on THM prevention through photocatalytic decontamination pretreatment showed similar results to Table 1. Although the ASU research demonstrated that the photocatalytic decontamination process could be used to eventually reduce THM levels, the treatment levels needed during the photocatalytic decontamination process to achieve the reduced THM levels were cost prohibitive. In accordance with the disclosed principles, however, the photocatalytic decontamination process is conducted at a level that would increase THM formation, rather than at the extreme levels needed to eliminate natural organic matter compounds altogether and thus reduce THM formation. Stated another way, to conduct the photocatalytic decontamination process at a level that is not cost prohibitive actually increases the chance for THM (and typically HAA) formation since the natural organic matter is broken down into biodegradable-sized molecules, and therefore it would be counterintuitive for practitioners to implement a photocatalytic process in the manner taught herein. However, when such a photocatalytic process is immediately followed by a biological treatment process, as discovered by the present inventors, this otherwise increase in the potential for THMs and HAAs is prevented.

Figure 2:
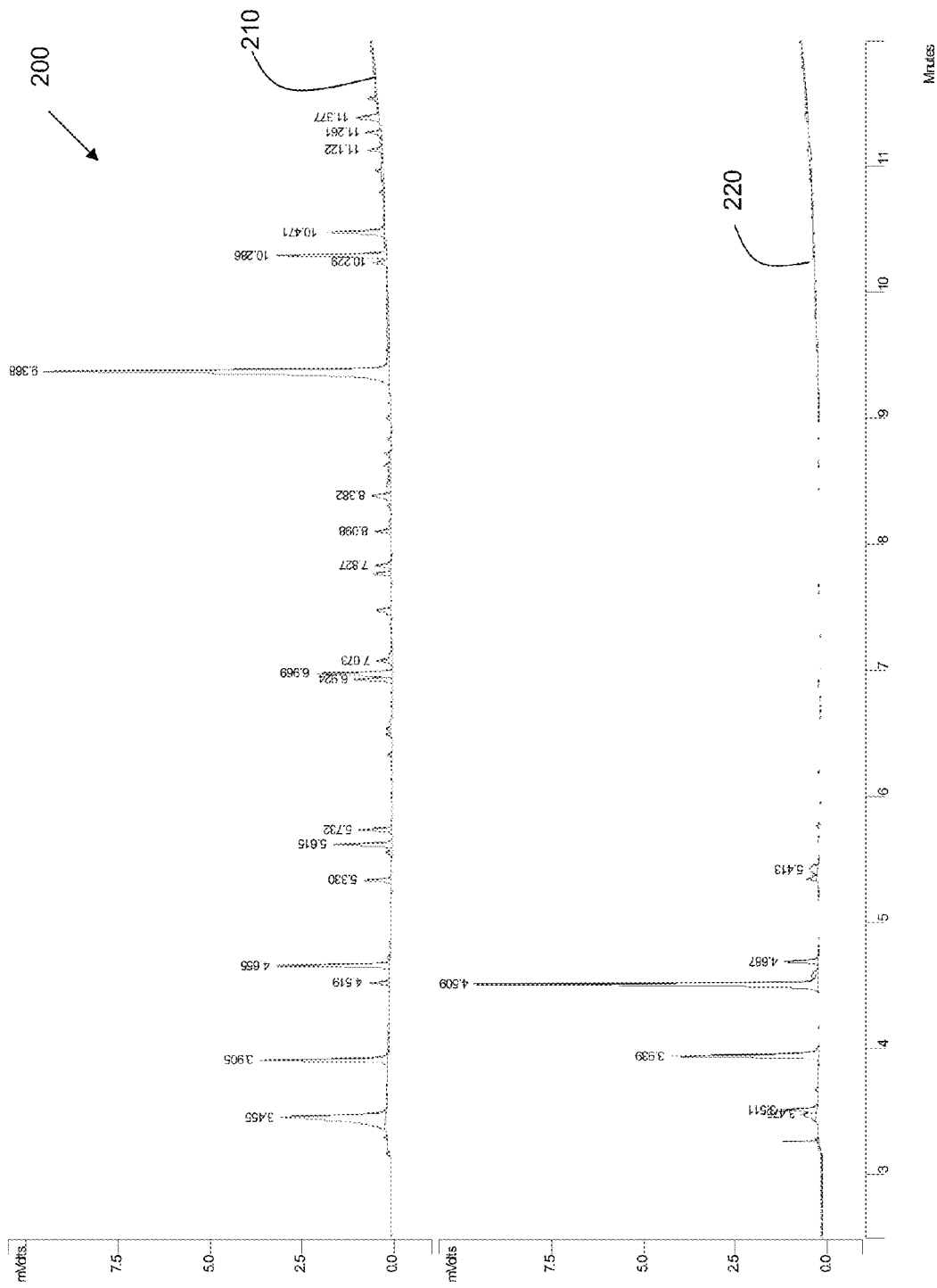
FIG. 2 illustrates two chromatograms that demonstrate how the molecular weight of natural organic matter is drastically reduced with a photocatalytic decontamination process.

The phenomena of reducing molecular weight of natural organic matter within water with a photocatalytic decontamination process has been demonstrated previously during treatment of oilfield wastewater. FIG. 2 illustrates two chromatograms 200 that demonstrate how the molecular weight of natural organic matter is drastically reduced with a photocatalytic decontamination process. Looking at the chromatograms 200, the upper graph 210 is the influent, while the lower graph 220 is the post-photocatalytic decontamination sample. As illustrated, the smaller molecular weight compounds shown on the left side of the bottom graph 220 are the biodegradable-sized organic compounds that can form THMs and HAAs over time, without the downstream biological process disclosed herein being implemented.

Typical by-products from the photocatalytic decontamination process are non-toxic, and consist mainly of benign compounds such as aldehydes, ketones and primarily carboxylic acids. FIG. 3 illustrates a graph 300 setting forth toxicity data from a photocatalytic decontamination process test on soil washing liquid. As shown in the graph 300, the photocatalytic decontamination process 130 readily destroys organics into benign, non-toxic organics, which would be bio-degradable to the downstream biological decontamination process 140. The benefits of having non-toxic organics in the output of the decontamination process is self-explanatory, as compared to the residual oxidants present in the output of advanced oxidation processes (AOPs), such as ozone or hydrogen peroxide-base systems.

Thus, an important aspect of an approach in accordance with the disclosed principles is that the photocatalytic decontamination system 130 operates without the use of hydrogen peroxide, ozone or other aggressive oxidants. Other AOPs all require such oxidants, which are typically added into the photocatalytic system(s). However, such processes do not consume all of the oxidants, and thus emit residual oxidant even after the decontamination process. Accordingly, the use of a photocatalytic process that does not include oxidant additives is a key benefit of the disclosed principles. Specifically, it permits the use of a biological process to be included immediately after the photocatalytic decontamination system. In stark contrast, using popular traditional AOPs that include ozone or hydrogen peroxide, etc. upstream of a biological process would require an intermediate process to eliminate the residual oxidant before the water reaches the biological process. Such oxidants would be detrimental to the biological process since they are aggressive disinfectants, which would attack the biological process, rendering it less effective or useless altogether. Consequently, it would be counterintuitive, and indeed potentially detrimental, to employ a conventional AOP that employs oxidants additives with the disclosed principles, since doing so would either detrimentally affect the downstream biological process, or would require the use of an additional oxidant removal system or systems that significantly increase the complexity and operational costs of the decontamination system.

Another key benefit of the use of a photocatalytic decontamination process without oxidant additives, as disclosed herein, is that the oxidative by-products are consistent, thus making a consistent feed to any biological process. Specifically, influent from different contaminated sources can vary greatly in their chemistry of contamination. When variable incoming chemistry is treated with other AOPs like the ozone or hydrogen peroxide processes discussed above, the levels of oxidant additives typically vary based on the incoming chemistry. However with photocatalytic decontamination processes as disclosed herein, the output of these processes results in a very stable bi-product. Thus, although incoming chemistry to the beginning of the system 100 may vary, the photocatalytic decontamination process 130 produces a stable output which is more predictably treated by the downstream biological process 140.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system for decontaminating fluid media, the system comprising:

a source providing fluid media contaminated with toxic natural organic matter;

a photocatalytic decontamination subsystem configured to oxidize the toxic natural organic matter via a photocatalytic process into non-toxic natural organic matter having a molecular weight low enough for biodegrading said non-toxic matter and having no residual oxidants;

a biological decontamination subsystem configured to immediately receive the contaminated fluid output from the photocatalytic decontamination subsystem, and employing a biological agent to biologically degrade the low-molecular weight non-toxic natural organic matter in the contaminated fluid to a concentration sufficient to prevent the formation of trihalomethanes or haloacetic acids; and a disinfectant sub-system configured to disinfect the fluid output from the biological decontamination subsystem, the disinfectant sufficient to remove substantially all remaining non-toxic natural organic matter and biological agent, wherein the biological decontamination subsystem comprises a biologically active activated carbon bed.

2. A system according to claim 1, wherein the photocatalytic decontamination subsystem comprises $TiO_2$ as a photoreactant.

3. A system according to claim 2, wherein the photocatalytic decontamination subsystem further comprises an ultraviolet light source for providing the photocatalytic reaction to the photoreactant.

4. A system according to claim 1, wherein the biodegradable non-toxic natural organic matter comprises one or more of aldehydes, ketones and carboxylic acids.

5. A system according to claim 1, wherein the contaminated fluid is contaminated drinking water.

6. A system according to claim 5, wherein the disinfectant sub-system is configured to disinfect the fluid output from the biological decontamination subsystem to a level sufficiently safe for public consumption.

7. A method of decontaminating fluid media, the method comprising:

providing a fluid media contaminated with toxic natural organic matter to a photocatalytic decontamination subsystem;

oxidizing the toxic natural organic matter via a photocatalytic process into non-toxic natural organic matter having a molecular weight low enough for biodegrading said non-toxic matter and having no residual oxidants;

employing a biological process to biologically degrade the low-molecular weight non-toxic natural organic matter in the contaminated fluid to a concentration sufficient to prevent the formation of trihalomethanes or haloacetic acids, wherein the biological process comprises employing a biologically active activated carbon bed; and disinfecting the fluid output from the biological decontamination subsystem sufficient to remove substantially all remaining non-toxic natural organic matter and biological agent introduced by the biological process.

8. A method according to claim 7, wherein the oxidizing comprises adsorbing $TiO_2$ to toxic natural organic matter and inducing a photocatalytic reaction on the adsorbed molecules using an ultraviolet light source.

9. A method according to claim 7, wherein the biodegradable non-toxic organics comprise one or more of aldehydes, ketones and carboxylic acids.

10. A method according to claim 7, wherein the contaminated fluid is contaminated drinking water.

11. A method according to claim 10, wherein the disinfecting comprises disinfecting the fluid output from the biological decontamination subsystem to a level sufficiently safe for public consumption.

12. A method of decontaminating fluid media, the method comprising:

providing a fluid media contaminated with toxic natural organic matter to a photocatalytic decontamination subsystem;

introducing a photoreactant to the contaminated fluid media, the toxic natural organic matter adsorbing to the photoreactant;

irradiating the adsorbed photoreactant and toxic matter molecules with ultraviolet radiation to oxidize the toxic natural organic matter into non-toxic natural organic matter having a molecular weight low enough for biodegrading said non-toxic matter and having no residual oxidants;

introducing a biological agent to the contaminated fluid media immediately after the oxidizing to biologically degrade the low-molecular weight non-toxic natural organic matter to a concentration sufficient to prevent the formation of trihalomethanes or haloacetic acids, wherein the biological agent comprises employing a biologically active activated carbon bed; and disinfecting to the fluid immediately after the biodegrading sufficient to remove substantially all remaining non-toxic natural organic matter and biological agent introduced by the biological process.

13. A method according to claim 12, wherein the contaminated fluid is contaminated drinking water.

14. A method according to claim 13, wherein the disinfecting comprises disinfecting the fluid to a level sufficiently safe for public consumption.

* * * * *